US009497490B1

(12) United States Patent
Smallwood et al.

(10) Patent No.: US 9,497,490 B1
(45) Date of Patent: Nov. 15, 2016

(54) CONTENT DELIVERY VIA PRIVATE WIRELESS NETWORK

(71) Applicant: Steven Bradley Smallwood, Claremore, OK (US)

(72) Inventors: Steven Bradley Smallwood, Claremore, OK (US); Benjamin Ross Woods, Broken Arrow, OK (US); Benjamin Tyler Clowdus, Tulsa, OK (US)

(73) Assignee: Steven Bradley Smallwood, Claremore, OK (US)

( * ) Notice: Subject to any disclaimer, the term of this patent is extended or adjusted under 35 U.S.C. 154(b) by 0 days.

(21) Appl. No.: 14/479,033

(22) Filed: Sep. 5, 2014

(51) Int. Cl.
| | |
|---|---|
| *H04N 21/235* | (2011.01) |
| *H04N 21/234* | (2011.01) |
| *H04N 21/238* | (2011.01) |
| *H04N 21/2665* | (2011.01) |

(52) U.S. Cl.
CPC ...... *H04N 21/23418* (2013.01); *H04N 21/238* (2013.01); *H04N 21/2353* (2013.01); *H04N 21/2665* (2013.01)

(58) Field of Classification Search
CPC .................. H04N 21/23418; H04N 21/2353; H04N 21/238; H04N 21/2665
See application file for complete search history.

(56) References Cited

U.S. PATENT DOCUMENTS

| | | | |
|---|---|---|---|
| 8,782,140 B1 | 7/2014 | Green | |
| 2009/0182647 A1* | 7/2009 | Sundaresan | G06Q 30/0601 705/26.1 |
| 2012/0072845 A1* | 3/2012 | John | G06F 17/30038 715/738 |
| 2013/0132836 A1* | 5/2013 | Ortiz | 715/716 |
| 2013/0316837 A1* | 11/2013 | Coiner, Jr. | G06F 17/30398 463/43 |
| 2014/0130079 A1* | 5/2014 | Arora | G06F 17/30837 725/24 |
| 2014/0294361 A1* | 10/2014 | Acharya et al. | 386/241 |
| 2014/0337346 A1* | 11/2014 | Barthel | G06F 17/30899 707/738 |
| 2015/0127486 A1* | 5/2015 | Advani et al. | 705/26.41 |
| 2016/0193530 A1* | 7/2016 | Parker | A63F 13/65 463/29 |

* cited by examiner

*Primary Examiner* — Pinkal R Chokshi
(74) *Attorney, Agent, or Firm* — Knobbe, Martens, Olson & Bear, LLP

(57) ABSTRACT

Aspects of the present invention correspond to the collection, processing and publication of video imagery corresponding to local sporting events. In one aspect, one or more components establish a private wireless network between video input devices and a video imagery processing device. The one or more components may be embodied in a portable housing independent of any infrastructure provided by the sporting venue. In another aspect, a control component can associate meta-data with an assessment of collected video imagery data. The video imagery data can be associated into individual plays and the meta-data corresponds to an assessment of the plays. In still a further aspect, processed video imagery data and any associated meta-data can be published to one or more input devices based on an assessed role or other permissions or otherwise stored.

23 Claims, 5 Drawing Sheets

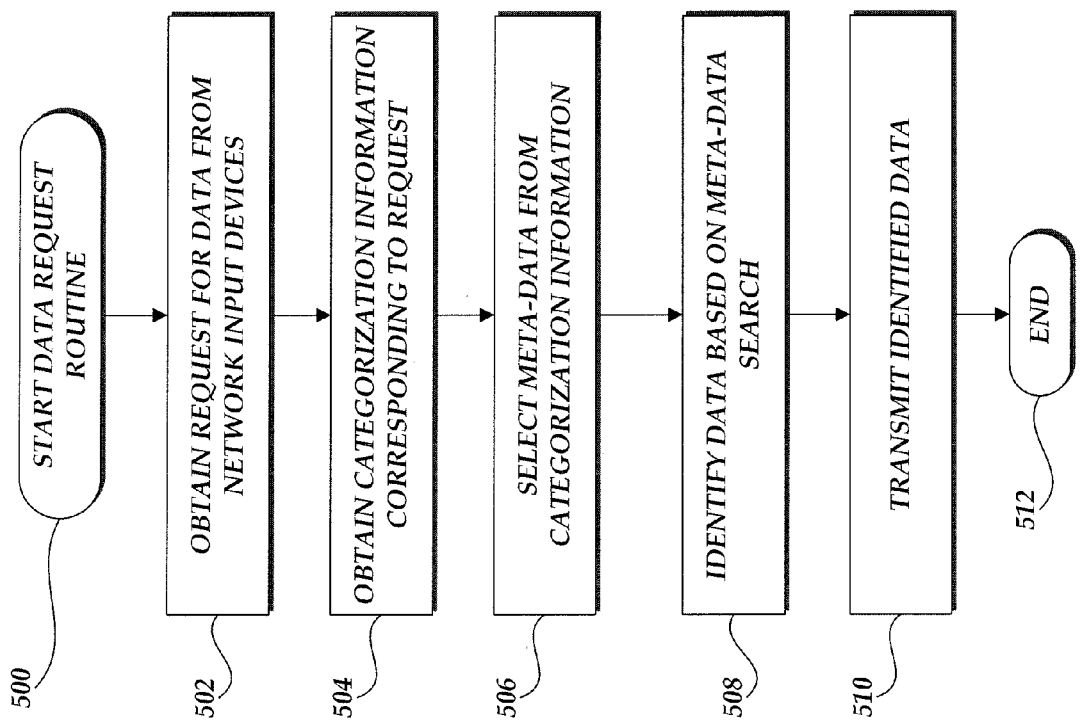

CONTENT DELIVERY VIA PRIVATE WIRELESS NETWORK

BACKGROUND

Generally described, the use of video imagery in sporting events has existed in many forms. For example, a sporting venue may provide camera equipment that broadcast video imagery to one or more video screens, such as for video replay for referees or audience members. In other examples, individuals may utilize a cellular wireless network to access typically facilitated for professional sporting events in which the stadiums, or other venues, are configured with expensive broadcasting equipment.

In addition to financial limitations associated with providing video imagery to different sporting events, some athletic associations or governing bodies had prevented the utilization of video imagery by the teams participating in a local sporting event. As policies or rules are modified to allow for the use of video imagery by teams, many venues, such as parks, high schools, etc., do not have the same infrastructure to facilitate the collection and processing of video imagery.

BRIEF DESCRIPTION OF THE DRAWINGS

Aspects and advantages of the embodiments provided herein are described with reference to the following detailed description in conjunction with the accompanying drawings. Throughout the drawings, reference numbers may be reused to indicate correspondence between referenced elements. The drawings are provided to illustrate example embodiments described herein and are not intended to limit the scope of the disclosure.

FIG. 5 is a flow diagram illustrative of a video requesting processing routine implemented by a control component.

DETAILED DESCRIPTION

Generally described, the present application corresponds to systems and methods for obtaining, processing, and delivering video imagery. More specifically, aspects of the present invention correspond to the collection, processing, and publication of video imagery corresponding to local sporting events. In one aspect, the present application includes one or more components for establishing a private wireless network between video input devices and a video imagery processing device. The one or more components may be embodied in a portable housing that facilitates the configuration of video collection devices, the private wireless network, and the processing of the video imagery data independent of any infrastructure provided by the sporting venue. In another aspect, the present application includes the generation or identification, by a control component, of meta-data associated with an assessment of collected video imagery data. The video imagery data can be segmented into individual plays and the meta-data corresponds to an assessment of the segmented plays (e.g., the segmented video imagery). In still a further aspect, the present application can correspond to the publication or transmission of processed video imagery data and any associated meta-data to one or more output devices based on an assessed role (e.g., a coach) or other permissions. The output devices may include additional functionality that facilitates the control and management of the video imagery data based on the meta-data.

The present application will be discussed with regard to illustrative examples and embodiments, illustrative screen displays, and types of sporting events. Such examples and embodiments are solely meant to be illustrative and should not necessarily be construed as limiting. For example, while many illustrative examples will be described with regard to football-based examples, the scope of the present application should not be limited specifically to attributes of football sporting events or specific categorizations or meta-data associated with football sporting events.

As mentioned above, one aspect of the present application corresponds to the provisioning and configuration of components utilized to collect and process video imagery data in a venue independent of any infrastructure available or provided by the venue. Illustratively, the components may be embodied in a portable housing to facilitate mobility and transportability.

Figure 1:
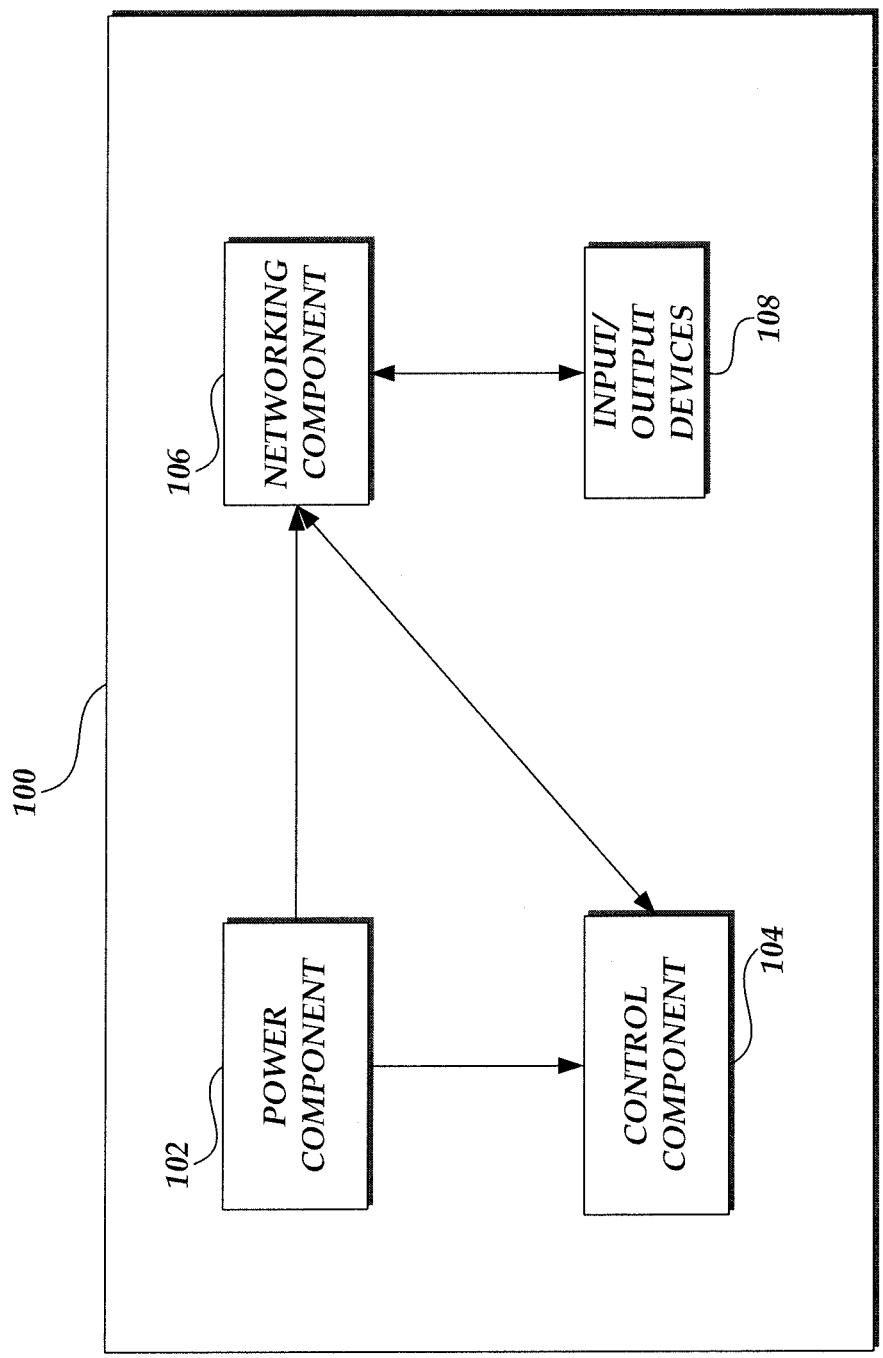
FIG. 1 is a block diagram illustrative of one or more components for facilitating the collecting and processing of video imagery data.

FIG. 1 is a block diagram illustrative of one or more components for facilitating the collecting and processing of video imagery data. With reference to FIG. 1, a housing component 100 can correspond to a portable container for facilitating the storage and transportation of other components. The housing 100 can include various attributes to facilitate transportation including handles, wheels, etc. The housing 100 can also include attributes to facilitate storage including mounts, brackets, sub-storage components, and the like. Still further, the housing 100 may include one or more openings, latches, doors, etc. that facilitate connection of the components with other components or equipment such as power sources (e.g., generators). Illustratively, the housing 100 may be constructed of a variety of materials, or combinations of materials, based on the intended use or desired level of portability/durability.

With continued reference to FIG. 1, the one or more components can include a power component 102. The power component 102 is illustratively configured to obtain power from a local power source (e.g., generator or locally provided power socket) and provide power to other components. The power component 102 can include extension cords, fuses, safety devices, and the like. Additionally, in some embodiments, the power component can include power generating equipment such as solar cells, fuel cells, gasoline engine, induction devices and the like.

The one or more components can further include a control component 104. Illustratively, the control component corresponds to one or more computing devices operative to obtain collected video imagery data and process video imagery data. The control component 104 can obtain power from the power component 102. Additionally, the control component 104 can be connected to other devices via a private network facilitated by a networking component 106. One skilled in the relevant art will appreciate that control component 104 can correspond to a variety of computing devices including, but not limited to, personal computing devices, server computing devices, laptop or tablet computing devices, mobile devices, gaming devices.

While the control component 104 is depicted in FIG. 1 as a single computing device or component, this is illustrative only. The control component 104 may be embodied in a plurality of computing devices. Generally described, any computing device implementing at least some aspects of the functionality associated with the control component 104 may include memory, processing unit(s) and computer readable medium drive(s), all of which may communicate with one another by way of a communication bus. The network interface may provide connectivity over the network or other networks or computer systems. The processing unit(s) may communicate to and from memory containing program instructions that the processing unit(s) executes in order to operate. The memory generally includes RAM, ROM or other persistent and auxiliary memory. The control component 104 can include an external data source interface component for obtaining external information from network data sources. One skilled in the relevant art will also appreciate that the control component 104 may include any one of a number of additional hardware and software components that would be utilized in the illustrative computerized network environment to carry out the illustrative functions of the control component 104 or any of the individually identified components.

Illustratively, the network component 106 can include one or more hardware networking devices that can establish a private network between the control component 104 and one or more networked input and output devices 108. Illustratively, at least some portion of the private network corresponds to a private, wireless network for facilitating the transmission of video imagery data from an input device to the control component 104 (directly or indirectly). The wireless networks can utilize one or more communication protocols including, but are not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface communication protocols (including, but not limited to, air interface protocols based on CDMA, TDMA, GSM, WCDMA, CDMA2000, TD-SCDMA, WTDMA, LTE, LTE-A, OFDMA and similar technologies).

The networked input and output devices 108 can correspond to a wide variety of devices. For example, input devices can correspond to video cameras or audio input devices that are configured to capture data associated with a sporting event. The input devices may be specifically configured to transmit captured data directly via the private wireless network. Alternatively, the input devices may be configured to utilize one or more additional hardware devices that function to transmit data via the private wireless network. For example, the input devices may be associated with an additional wireless transmitter component that can be configured with additional security or authentication credentials.

The output devices can also correspond to a wide variety of devices. For example, the output devices can correspond to mobile devices, portable computing devices, tablet computing devices, and the like that are configure to receive processed video imagery data and display the data. The output devices may be individually addressable on the private, wireless network. Additionally, the output devices may be associated with particular users or subscribers. For example, one or more coaches of a team, such as football team, may be associated with particular devices such that processed video imagery data may be directly transmitted to particular coaches. Still further, in some embodiments, the output devices may include additional software functionality, such as a browser software application or viewer application, that facilitates searching for video imagery segments, management of stored video imagery segments or controls for playing video imagery segments on one or more displays, such as a display associated with the output device.

Figure 2:
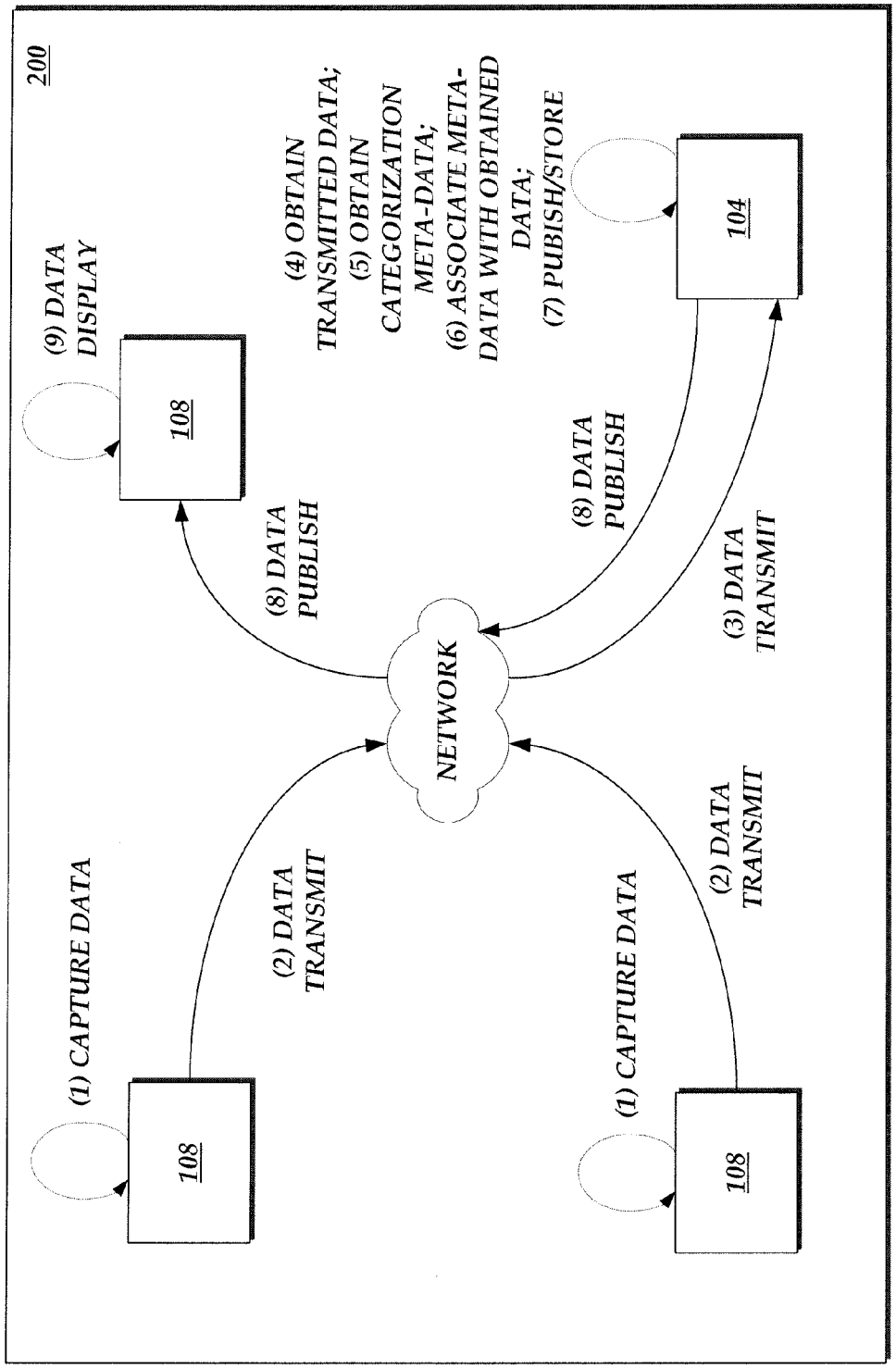
FIG. 2 is a block diagram illustrating the interaction of components of FIG. 1 is a venue.

Turning now to FIG. 2, illustrative interactions between the components of the present application will be described. For purposes of the illustration of FIG. 2, it is assumed that various input devices 108 have been placed in a venue 200 and are configured to capture video imagery data. Additionally, the control component 104, input/output devices 108 are capable to of exchanging data via a private wireless network established via the networking component 106. With reference to FIG. 2, the input devices 108 capture data, such as plays of a game (e.g., a football game) at (1). The input devices may be controlled to only capture a sequence of images best approximated to a single play, such as by including user input or other cues. The input devices may also be configured to continuously capture data that may encompass any number of plays. The captured data is then transmitted to the control component 104 via the wireless network at (2). The transmission of the video imagery data can include the utilization of various communication and networking protocols, such as encryption, compression, etc.

The captured data is transmitted to the control component 104 for further processing at (3). Illustratively, the control component 104 obtains the transmitted data at (4). Additionally, at (5), the control component 104 obtains categorization data. As will be described in greater detail below, the categorization data can include an assessment of one or more attributes of a play, such as a type of play (e.g., a running play), an outcome of the play (a sack), progress (e.g., number of yards gained), etc. Illustratively, the categorization data may be obtained by a user interfacing with the control component 104 and watching the video imagery. In another embodiment, the categorization data, or a portion thereof, may be automatically generated by the control component 104 via software processes. To the extent required, the control component 104 can also process the incoming video imagery data so that it most closely resembles increments of single plays (e.g., video editing).

At (6), the control component 104 associates meta-data with the obtained video imagery data. The meta-data can directly correspond to the categorization data mentioned above. Alternatively, the meta-data may be based on the categorization data and can include additional data such as attributes of how the categorization information was obtained, external reference information (e.g., location, timestamp, etc.). At (7), the control component 104 can store the video imagery data and associated meta-data, such as in a data store. In another example, the control component 104 can publish or transmit the video imagery data to one or more devices.

As illustrated in FIG. 2, at (8), the control component 104 transmits data to an output device, which displays the data at (9). Illustratively, the published video imagery data may be transmitted to single devices or sets of devices as specified by logical rules or other processing instructions. In some embodiments, the output devices may include viewer or browser functionality that facilitates the sorting of a set of video imagery data and control of the playback of selected video imagery segments. For example, the output devices may facilitate the specification of a set of searching criteria that identifies specific video imagery segments matching, or most closely matching, the input criteria. Additionally, in some embodiments of the present application, the transmission of the video imagery segments may be considered to be transmitted to at least one output device in a real-time or substantially real-time basis. For example, the control component 104 may be configured to transmit at least a portion of a collected video imagery segment and its associated meta-data within a specified time window or upon completion of the processing of the meta-data.

Figure 3:
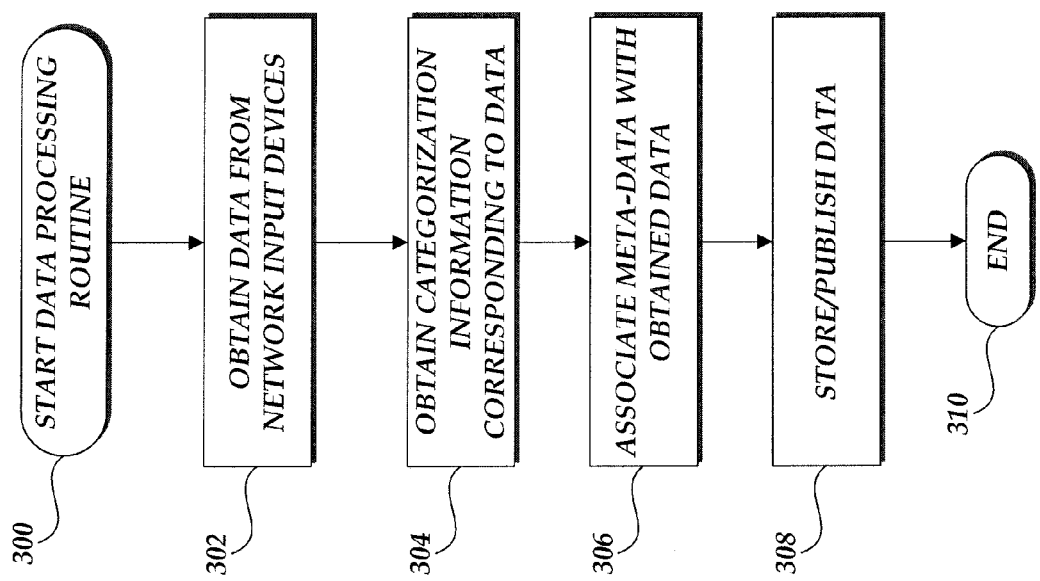
FIG. 3 is a flow diagram illustrative of a video imagery collection routine implemented by a control component.

Turning now to FIG. 3, a flow diagram of a data processing routine 300 implemented by the control component 104 will be described. At block 302, captured video imagery data is then transmitted to the control component 104 via the network, such as a wireless network or a wired network. As described above, the captured video imagery data is transmitted from one or more video cameras configured to utilization wireless communication protocols. The transmission of the video imagery data can include the utilization of various communication and networking protocols, such as encryption, compression, enhancement, conversion, etc. In other embodiment, one or more video input devices may utilize a hardwired connection. Additionally, in some embodiments, the control component 104 can be configured to accept video imagery data from individuals or devices that are otherwise not dedicated to collecting video imagery data in a peer-to-peer model. For example, fans/attendees at a sporting event can volunteer to provide video imagery data via a mobile device that can establish communications, at least temporarily, with the control component 104.

At block 304, the control component 104 obtains categorization data. As previously discussed, in an illustrative embodiment related to video imagery data corresponding to an athletic event, the categorization data can include an assessment of one or more attributes of a play, such as a type of play (e.g., a running play), an outcome of the play (e.g., a touchdown, a sack, a gain of yard, a loss of yard, a fumble, an interception, etc.), progress (e.g., a number of yards gained/lost), and other information relating to, or describing, aspects of the play or set of plays. In another example, the categorization data can include a reference to a designated play, identified players/athletes, designated formations, and the like. Still further, the categorization data can include reference to externally provided information including timestamp information location information, weather information (e.g., temperature, wind speed, humidity), and the like.

Illustratively, the categorization data may be obtained by a user interfacing with the control component 104 and watching the video imagery. An illustrative screen display for collecting categorization data will be described below with regard to FIG. 4. In some embodiments, the assessment of the one or more attributes may be defined such that a user may select from a set of available attributes. In one example, a user may be presented with a set of categories, or buckets, in which the selection of the categorization data corresponds to a selection of one or more applicable categories. In another example, the user may be presented with the opportunity to designate categorization information in a more free-form manner, such as text inputs, audio commentary and the like. In other embodiments, the assessment of the one or more attribute may be more rigidly defined such that a user must provide an answer, or otherwise select a default value, for a set of defined attributes. In another embodiment, the categorization data, or a portion thereof, may be automatically generated by the control component 104 via software processes. To the extent required, the control component 104 can also process the incoming video imagery data so that it most closely resembles increments of single plays (e.g., video editing).

At block 306, the control component 104 associates meta-data with the obtained video imagery data. The meta-data can directly correspond to the categorization data mentioned above. For example, the categorization data may directly correspond to meta-data or be mapped to defined meta-data. Alternatively, the meta-data may be based on the categorization data and can include additional data such as attributes of how the categorization information was obtained, external reference information (e.g., location, timestamp, etc.). Additionally, in this embodiment, the control component 104 may utilize filtering rules to determine whether one or more categorization data may be omitted or otherwise not identified as meta-data. For example, the control component 104 may filter weather related data if weather data collected for a particular video imagery segment is not substantially different from previously collected weather information. Additionally, the control component 104 can also apply rules or other business logic to the collected categorization data based on an identity/reputation of a user provided the categorization data. In this capacity, some of the categorization data may be given a weight or otherwise filtered based on previous experiences, permissions, etc. In this example, the control component 104 may be able to accept video imagery data or categorization data on a peer-to-peer basis.

At block 308, the control component 104 can store the video imagery data and associated meta-data, such as in a data store. In another embodiment, the control component 104 can publish or transmit the video imagery data to one or more devices, such as an addressable device corresponding a particular coach or set of coaches. As previously specified, in this embodiment, the output devices may be receive the video imagery data via a wireless network connection and utilize one or more software applications for managing the processed video imagery data, such as a viewer or browser application. Additionally, in some embodiments, the publication of the video imagery data may be accomplished on a real-time or substantially real-time basis. For example, the control application 104 may transmit video imagery data in accordance with a maximum time window such that all transmissions are intended to be transmitted prior to the expiration of the maximum time window. In another example, the timing associated with the transmission of the video imagery data may correspond to the intended recipient. For example, an output device associated with a coach may be associated with a smaller time window for receiving transmission compared to an output device associated with a user in the general public. Still further, in other embodiments, the transmission of the video imagery segments to an output device can include the transmission of notifications or links that facilitate the access of video imagery segments directly from a storage component or service. At block 310, the routine ends.

Figure 4:
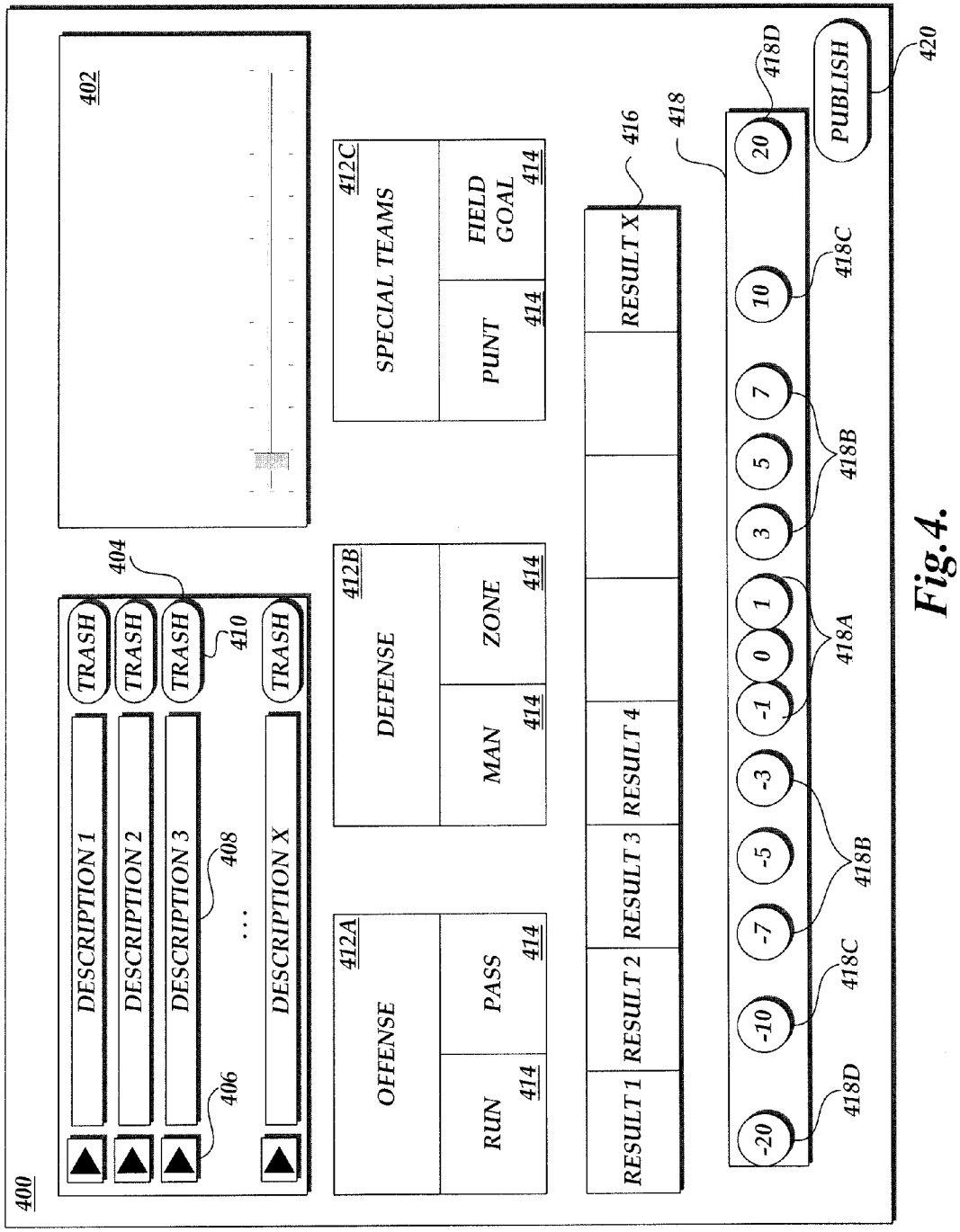
FIG. 4 is a block diagram illustrative of a screen display generated by an output device for associating meta-data to collected video imagery data.

Turning now to FIG. 4, an illustrative screen display 400 generated by the control component 104 will be described. One skilled in the relevant art will appreciate the screen display 400 is illustrative in nature and that one or more screen displays could implemented in accordance with the present application incorporating additional features or components. With reference to FIG. 4, the screen display 400 includes a first portion 402 for rendering collected video imagery data. The first portion 402 would illustratively include any one of a variety of video controls, such as play, pause, progress bars, etc. Additionally, the first portion could include further controls to modify the size of the portion relative to the screen display 400.

The screen display 400 can also include a second portion 404 for managing a set of collected video imagery data. The second portion can include controls 406 for selecting which video imagery clip to play, identification information 408 describing the video imagery segment (e.g., the play called)

and additional controls 410 for deleting, reordering or otherwise managing the set of video imagery data. Illustratively, the screen display 400 can also incorporate or adopt other file management techniques or paradigms to assist in the management of video imagery data.

With continued reference to FIG. 4, the screen display 400 can also include a third portion 412 for collecting categorization information/data, namely, an assessment of a type of play. For example, the screen display 400 includes a portion 412A for assessing a type of offensive play 414 (e.g., a run or a pass), a portion 412B for assessing defensive formations 414 (e.g., man or zone) a portion 412C for assessing special teams plays 414 (e.g., punt, field goal, kickoff, etc.). Illustratively, the portion 412/414 can correspond to display objects that are selectable by a user via input device such as touch screens, mouse, keyboards, audio controls, etc. In other embodiments, a user may interface with the control component 104 via a separate device such that the user inputs are provided to the control component 104. For example, a user may access a portion of the screen display 400 via a mobile device in communication with the control component 104 via short range wireless connections, such as the Bluetooth wireless communication protocol. Additionally, the plays 414 illustrated in FIG. 4 are illustrative and are not limited to the only type of assessment possible.

The screen display 400 can also include a fourth portion 416 for obtaining categorization information regarding a result of the particular video imagery segment. Examples of results, corresponding to a football event, can include, but are not limited to, touchdown, incomplete pass, fumble sack, interception, penalty, safety, blocked kick, broken play, etc. In other embodiments, the result can be one of an interpreted positive result, negative results or neutral result (e.g., "positive yards," "negative yards," or "no gain"). Similarly, the results discussed are illustrative and are not limited to the only type of results assessments possible.

The screen display 400 can also include a fifth portion 418 for obtaining categorization information regarding an assessed result of the particular video imagery segment. With reference to FIG. 4, in an illustrative example corresponding to a football event, the result corresponds to a categorization of the specific amount of yards gained or lost on a particular play. As illustrated in screen display 400, the fifth portion 418 includes controls 418A-418D that facilitate the selection of a number of yards gained or lost in a play. In some embodiments, as illustrated in FIG. 4, the spacing of the controls 418 can also correspond to an approximate measure of the yards in which the spacing on the screen display 400 of controls 418A are closer than the spacing of controls 418B, which are closer than the spacing for 418C and 418D. In this case, the user is provided an appearance of a net result, which may facilitate collection of the categorization data in real-time.

The screen display 400 can further include a sixth portion 420 for controlling the publication or storage of the collected video imagery segment and the categorization information. For example, the portion 420 can include a control to publish the video segment such that a video segment is automatically sent to one or more designated individuals, such as a coach or a set of coaches. In other embodiments, a user may be prompted to identify to whom the video imagery segment may be sent. Still further, the portion 420 can also include controls for facilitating the storage or archiving of the video imagery segment.

Turning now to FIG. 5, a flow diagram of a data request routine 500 implemented by the control component 104 will be described. Illustratively, routine 500 can be implemented to process request for specific video imagery data. In some embodiments, however, the video imagery data may be automatically transmitted without requiring the processing of a request. Still in other embodiments, at least some portion of routine 500 may be implemented in an output device 108 to facilitate searching for video imagery segments provided by the control component 104 or otherwise made accessible to the output device by the control component. Accordingly, while routine 500 will be described with regard to implementation by the control component 104, aspects of the routine 500 can be implemented by other components as appropriate.

At block 502, the control component 104 obtains a request for video imagery data including selection criteria. The selection criteria can correspond to one or more of the categorization data. As previously discussed, in an illustrative embodiment related to video imagery data corresponding to an athletic event, the categorization data can include an assessment of one or more attributes of a play, such as a type of play (e.g., a running play), an outcome of the play (e.g., a touchdown, a sack, a gain of yard, a loss of yard, a fumble, an interception, etc.), progress (e.g., a number of yards gained/lost), and other information relating to, or describing, aspects the paly or set of plays. In another example, the categorization data can include a reference to a designated play, identified players/athletes, designated formations and the like. Still further, the categorization data can include reference to externally provided information including timestamp information location information, weather information (e.g., temperature, wind speed, humidity) and the like. At block 504, the control component 104 identifies categorization data corresponding to data request by filtering out the selection criteria, utilizing profile information or otherwise obtaining additional information.

At block 506, the control component 104 identifies meta-data that will be used to search the obtained video imagery data. As previously discussed, the meta-data can directly correspond to the categorization data mentioned above. For example, the categorization data may directly correspond to meta-data or be mapped to defined meta-data. Alternatively, the meta-data may be based on the categorization data and can include additional data such as attributes of how the categorization information was obtained, external reference information (e.g., location, timestamp, etc.). At block 508, the control component 104 identifies the previously stored video imagery data and associated meta-data, such as by transmitting a query to a data store.

At block 510, the control component 104 transmits or otherwise publishes the identified video imagery data. In one example, the control component 104 can identify potentially relevant video imagery data via a traditional screen interface corresponding to a text search, Web search and the like. In another example, the control component 104 can identify potentially relevant video imagery data in a graphical form. For example, the results of the search can be encompassed in graphical objects in which the more relevant video imagery segments are represented in larger dimension graphical object. In another embodiment, the control component 104 can automatically begin broadcasting or transmitting the identified video imagery data. At block 512, the routine ends.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. In a system including a control component communicating with one or more video capturing devices via a private communication network, a method for managing video imagery data comprising:
    obtaining video imagery data via the private network associated with a local sporting event, wherein the video imagery data includes at least one individual sequence of video images approximated to a defined play in the sporting event;
    for the at least one individual sequence of video images approximated to a defined play, obtaining categorization information based on a human assessment of one or more attributes of the defined play depicted in the obtained video imagery data, wherein the one or more attributes are selected from a set of available attributes;
    identifying meta-data based on the obtained categorization information; and
    causing storage of the obtained video imagery data and the meta-data and publication, via the private communication network, of the obtained video imagery data and the meta-data to a set of recipients automatically within a defined publication time window and without receipt of a request from individual recipients, wherein the set of recipients and the defined publication time window are defined according to roles in the sport event.

2. The method as recited in claim 1, wherein obtaining categorization information based on a human assessment of a play depicted in the obtained video imagery data includes obtaining a human assessment of a measure of success in the play depicted in the video imagery data.

3. The method as recited in claim 2, wherein obtaining an assessment of the measure of success includes an assessment of measured progress.

4. The method as recited in claim 1, wherein obtaining categorization information based on a human assessment of a play depicted in the obtained video imagery data includes obtaining an assessment of a player formation depicted in the video imagery data.

5. The method as recited in claim 1, wherein the private communication network corresponds to a private, wireless communication network.

6. The method as recited in claim 1 further comprising:
    obtaining a request for stored video imagery data, the request including selection criteria;
    matching the selection criteria to one or more meta-data; and
    identifying stored video imagery data based on the matched selection criteria and meta-data.

7. The method as recited in claim 1, wherein causing the publication, via the private communication network, of the obtained video imagery data and the meta-data includes:
    identifying an individual associated with a type of play; and
    causing a transmission of video imagery data to the identified individual.

8. The method as recited in claim 1, wherein causing the publication, via the private communication network, of the obtained video imagery data and the meta-data includes causing the publication of the obtained video imagery data and the meta-data in a substantially real-time basis.

9. A system comprising:
    one or more computers including processors and memory, the memory including instructions that, upon execution, cause the one or more computers to:
        obtain video imagery data associated with a local event, wherein the video imagery data is associated with individual sequence of images;
        process the video imagery data to approximate the individual sequences of images to individual plays defined in accordance with the local event;
        obtain meta-data based on categorization information from a graphical interface generated by the one or more computers, the categorization information corresponding to a human assessment of one or more attributes of a play depicted in the video imagery data, wherein the one or more attributes are selected from a set of available attributes;
        process the meta-data based on information associated with the human assessment; and
        cause publication, via a private wireless communication network, of the obtained video imagery data and the meta-data to at least one recipient automatically without receipt of a request within a defined time frame based on a defined role associated with the at least one recipient.

10. The system as recited in claim 9, wherein the categorization information includes an assessment of a measure of success in the play depicted in the video imagery data.

11. The system as recited in claim 9, wherein the categorization information includes an assessment of a focal point of a play depicted in the video imagery data.

12. The system as recited in claim 9, wherein the one or more computers further:
    identify an individual associated with a type of play; and
    cause a transmission of video imagery data to the identified individual.

13. The system as recited in claim 9, wherein the one or more computers further obtain categorization information from an interface provided to a user.

14. The system as recited in claim 9, wherein the one or more computers cause publication, via the private wireless communication network, of the obtained video imagery data and the meta-data in a substantially real-time basis.

15. The system as recited in claim 9, wherein the one or more computers obtain video imagery data associated from the local event from at least one of a wired communication network or the wireless private communication network.

16. The method as recited in claim 1 further comprising obtaining externally provided characterization information corresponding to at least one of timestamp information, weather information, or location information.

17. The system as recited in claim 9, wherein the one or more computers obtain externally provided characterization information to at least one of timestamp information, weather information, or location information.

18. In a system including a control component communicating with one or more video capturing devices via a private communication network associated with a local sporting event, a method for managing video imagery data comprising:
- obtaining video imagery data via the private communication network associated with the local sporting event, wherein the video imagery data is segmented into individual plays of the local sport event;
- causing generation of a user interface for displaying the video imagery data obtained from the private communication network;
- obtaining categorization information from inputs generated from the user interface, the inputs corresponding to a human assessment of one or more attributes of a play depicted in the obtained video imagery data, wherein the one or more attributes are selected from a set of available attributes;
- processing the categorization information based on information associated with the human assessment;
- defining meta-data based on the processed categorization information; and
- causing publication, via the private communication network, of the obtained video imagery data and the meta-data in accordance to at least one specified recipient within a specified time frame based on a role of the at least one specified recipient in the local sporting event.

19. The method as recited in claim 18, wherein obtaining categorization information based on a human assessment of a play depicted in the obtained video imagery data includes at least one of obtaining an assessment of a player formation depicted in the video imagery data, obtaining an assessment of a measure of success in the play depicted in the video imagery data, or obtaining an assessment of a focal point of a play depicted in the video imagery data.

20. The method as recited in claim 18 further comprising:
- obtaining a request for stored video imagery data, the request including selection criteria;
- matching the selection criteria to one or more meta-data; and
- identifying stored video imagery data based on the matched selection criteria and meta-data.

21. The method as recited in claim 1 further comprising for the individual sequence of video images approximated to a defined play, filtering a portion of the categorization information based on identified common categorization information for multiple individual sequence of video images.

22. The system as recited in claim 18, wherein the specified time frame is defined in accordance with a role associated with one or more recipients of the video imagery data and the meta-data.

23. The system as recited in claim 18, wherein causing publication, via a private wireless communication network, of the obtained video imagery data and the meta data includes causing transmission of the obtained video imagery data and the meta-data to at least one recipient automatically without receipt of a request.

* * * * *